United States Patent [19]

Mehlan et al.

[11] Patent Number: 4,768,680

[45] Date of Patent: Sep. 6, 1988

[54] DISPENSING UNIT FOR VENDING MACHINES

[75] Inventors: Bernd Mehlan, Herrieden; Erich Stiefel, Lichtenau; Josef Bayer; Klaus Lechner, both of Herrieden, all of Fed. Rep. of Germany

[73] Assignee: Sielaff GmbH & Co. Automatenbau Herrieden, Fed. Rep. of Germany

[21] Appl. No.: 7,783

[22] Filed: Jan. 28, 1987

[30] Foreign Application Priority Data

Mar. 18, 1986 [DE] Fed. Rep. of Germany ....... 3608942

[51] Int. Cl.[4] .............................................. B65G 59/00

[52] U.S. Cl. ...................................... 221/123; 221/92; 221/299

[58] Field of Search ................. 221/95, 112, 116, 123, 221/124, 126, 127, 289, 92, 299; 312/45

[56] References Cited

U.S. PATENT DOCUMENTS

| | | | |
|---|---|---|---|
| 997,149 | 7/1911 | Mosteller | 221/123 X |
| 2,825,488 | 3/1958 | Nelson | 221/126 X |
| 4,019,650 | 4/1977 | Oden | 221/116 |
| 4,298,138 | 11/1981 | Oden | 221/116 X |

FOREIGN PATENT DOCUMENTS

| | | | |
|---|---|---|---|
| 853048 | 11/1960 | United Kingdom | 221/112 |
| 1046997 | 11/1966 | United Kingdom | 221/124 |

*Primary Examiner*—Joseph J. Rolla
*Attorney, Agent, or Firm*—McGlew and Tuttle

[57] ABSTRACT

A dispensing unit with a pair of product containing shaft for bottles or cans, can dispense two different types of product per shaft pair and has a high storage capacity while being compactly built. To this end a common element is assigned to a shaft pair which element can be rotated from a resting position, selectively to the right or left.

13 Claims, 9 Drawing Sheets

DISPENSING UNIT FOR VENDING MACHINES

FIELD AND BACKGROUND OF THE INVENTION

The present invention relates in general to vending machines and in particular to a new and useful dispensing unit on the merchandise chutes or shafts of a vending machine, especially those for cans or bottles with block and support areas at the lower end of the merchandise shafts. The merchandise stack, in the resting position of a dispensing element for the stack, is kept in the merchandise shaft by the block area so that no merchandise reaches the support area. By rotation of the block area, a product reaches the support area and this product leaves the support area in the direction of a dispensing shelf compartment.

A shelf dispensing unit of this kind is described in German OS No. 25 10 500. In this reference, a dispensing element is provided for each merchandise shaft. To increase the capacity in each merchandise shaft, two rows of products are stored in staggered fashion with respect to each other, which now are only joined together just before the dispensing element. With this kind of vending machine it is not possible to increase the number of types of product available.

With German OS No. 25 10 500 the dispensing element has two cross bars which are driven by an electric motor via an eccentric in such a way that one bottle or can reaches the dispensing compartment at a time. Since the dispensing element has to be moved against the weight of the merchandise column the motor has to be correspondingly strong. The motor is placed in such a way that it occupies a part of the depth in the vending machine. The depth of the machine is thus limited with respect to the volume of merchandise it can hold.

In German Pat. No. 29 16 694, a dispensing unit of the kind mentioned above is also described. Here too, each merchanidse shaft has its own dispensing element. The dispensing element is moved alternately from right to left. It is necessary to have as many merchandise shafts available as there are kinds of merchandise to dispense.

According to German Pat. No. 29 16 694, the shaft can be designed so that a guiding metal sheet narrows it in its front half to one side and in its back half to the other side. It thus becomes possible to stack shorter products whereby alternately one product of the back supply of products and one product of the front supply is dispensed.

SUMMARY OF THE INVENTION

An object of the present invention is to provide a dispensing unit of the above mentioned kind having a compact design in which variability between two different types of merchandise per shaft pair and high capacity of one type of merchandise in the shaft pair exists.

According to the invention, a common dispensing element is assigned to a shaft pair. The shafts of the shaft pin stand next to each other and the dispensing element can be rotated selectively to the right or to the left. In the resting position of the dispensing element, the right and the left shafts are blocked off. During rotation of the dispensing element to the right, a product in the right shaft is blocked and a product of the other shaft reaches the support area. This released product leaves the support in the direction of the dispensing compartment before the resting position is again reached.

In the described dispensing unit one dispensing element suffices for two merchandise shafts. In the shafts two different types of merchandise can be stored. Depending on the direction of rotation to the right or left a product of one or the other type is dispensed.

In the case of the described dispensing unit, a structural simplification and especially great space savings are achieved. It is possible, in particular, to place an electric motor to drive the dispensing element below it so that the motor does not decrease the depth available for the stacking of the merchandise. There is also an advantage in that the dispensing element does not need to lift the merchandise stack. The weight of the merchandise stack acts in the direction of rotation of the motor when a product reaches the support area or leaves it.

The merchandise shafts do not need to stand vertically. They can also be inclined. The lateral pressure exerted by the merchandise is not raised by the dispensing unit.

A preferred development of the invention consists in that, in the resting position, the block area of the dispensing element with its right half, blocks the right shaft and with its left half the left shaft, so that during rotation to the right, the left half of the block area keeps the right shaft blocked and a product of the left shaft reaches the support area whereby this product leavs the support area in the direction of the dispensing compartment during return into the resting position. During rotation to the left, the right half of the block area keeps the left shaft blocked and a product of the right shaft reaches the support area, whereby this product leaves the support area during rotation back into the resting position in the direction of the dispensing compartment.

Two modes of operation of the dispensing element are possible. Either the dispensing element is rotated during each dispensing process alternately to he right and to the left or the dispensing element is rotated selectively to the right or to the left during each dispensing process. In the first case, both merchandise shafts of the shaft pair contain the same merchandise type. In the second case, in the two merchandise shafts of the shaft pair, different types are stored. The product dispension from two merchandise shafts, thereby, can be controlled with only one dispensing element where either the total capacity of the shaft pair is utilized for only one producttype or is divided between two types of merchandise. To change from one possible option to the other neither the shafts nor the dispensing element need to be rebuilt.

A development of the invention which treats the merchandise particularly carefully and is at the same time quiet during operation is characterized in that the dispensing element uses a screen which can be rotated with respect to the dispensing element and which forms a further additional blocking area. In the resting position, the screen blocks the right and the left shaft. During rotation of the dispensing element in one rotational direction the screen rotates in the opposite direction and blocks one shaft and the support area of the dispension element blocks the other shaft until one product of this shaft reaches the support area. During continued rotation, this product leaves the support area in the direction of the dispensing compartment, and the dispensing element and the screen assume the resting position.

This development achieves the effect that the merchandise does not fall freely from small heights onto the support area (onto the block surface) so that the product is not damaged and the dispensing process can take place with little attending noise.

A further object of the invention is to provide a dispensing unit for a vending machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention ar illustrated.

DESCRIPTION OF THE PREFERRED EMBODIMENTS

Figure 1:
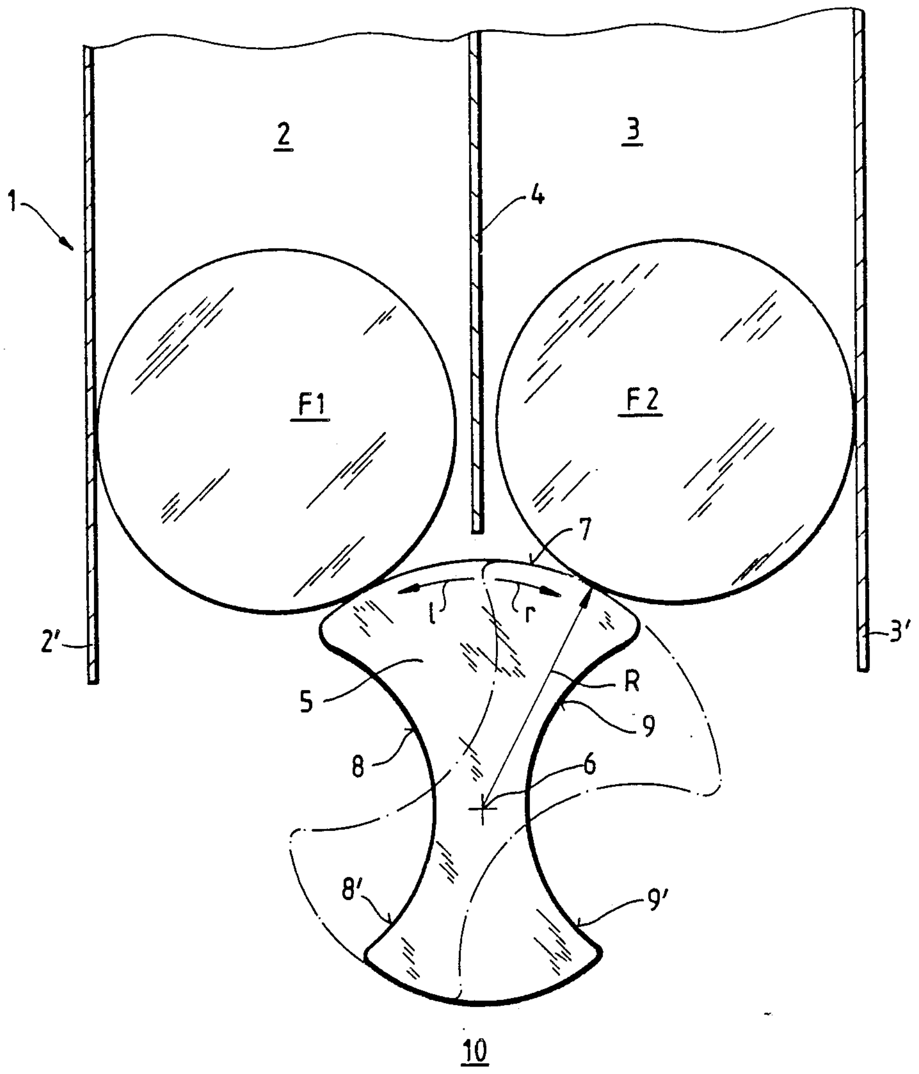
FIG. 1 is a schamitc sectional view of a pair of shafts of a vending machne with one dispensing element of the invention.

In the housing of a vending machine (not further described), several dispensing units 1 are placed one next to the other (FIG. 1). Each dispensing unit 1 has a shaft pair consisting of two shafts or chutes 2,3 which are separated by a partitioning wall and enclosed by shaft walls 2', 3'. The depth of the shafts 2,3 perpendicular to the plane of the drawing, runs in the direction of the depth of the vending machine. The shafts 2,3 are intended to hold bottles or cans F1, F2.

Below the two shafts 2,3 is a dispensing element 5 which is common to both and which can be rotated around a rotational axis 6. The rotational axis 6 lies in a common median plan with the partitioning wall 4. The dispensing element 5 and its drive are located below the shaft pair 2,3 and do not require further space below an adjacent additional shaft pair so that in the vending machine the shaft pairs can be arranged close to each other.

The dispensing element 5 has a block area 7 which extends at a radius R around the rotational axis 6. The radius R is smaller than the width of one of the shafts 2,3. The arc length of the block area 7 has such measurements that in its resting position (solid line in FIG. 1) it can keep the bottles or cans of the left shaft 2 and the right shaft 3 from sliding, with its left half and its right half. Each of the lowest bottles or cans F1,F2 of the shafts 2,3 thus rests on the respective left or right half of the block area.

On both sides of the block area 7 support areas 8,9 are provided . These are dimensioned such that during rotation of the dispensing element 5 from the resting position, the bottle or can which is lowest at any given time drops onto and rests securely on the part of the area 8' or 9' of the support area 8 or 9 spaced away from the block area 17. The dispensing element thus supports the bottles or cans stored above.

The support areas 8,9 furthermore are so dimensioned that while the dispensing element 5 moves back into its resting position, the block area 7 reaches under the next bottle or can before the next lowest bottle or can leaves the support area 8 or 9 in the direction of a dispensing compartment of the vending machine (not further described here). The possibility is thereby avoided that the block area 7 during its motion underneath a column of merchandise or cans, must lift these items.

The operation of the described unit according FIG.1 is approximately as follows:

If a bottle or a can F1 of the left shaft 2 is intended to be dispensed, the dispensing element is moved in the direction of the arrow r to the right around the rotational axis 6 until the dispensing element assumes approximately the position shown in dashed lines in FIG. 1. The block area 7 thereby moves underneath the lowest bottle or can F2 of the right shaft until its left half also stands in the right shaft 3. Thereby the lowest bottle or can F1 in the left shaft 2 also reaches the support area 8 whereby the remaining bottles or cans move along. Immediately subsequently a reversal of motion takes place so that the block area 7, now moving in the opposite direction of arrow moves below the next bottle or can of the shaft 2 and thus supports these and the bottles or cans standing above. The bottle or can lying on the support area 8 rolls simultaneously off the support area 8. In the resting position the dispensing unit 5 remains at a standstill.

If a bottle or can F2 is intended to be dispensed from the right shaft 3, the dispensing element 5 is rotated in the direction of the arrow 1 . Thereby the right half of the block area 7 moves below the bottles or cans F1 of the left shaft 2 and in the right shaft 3 the lowest bottle or can slides onto the support area 9. After motion reversal, it is dispensed.

It is apparent that product dispensing can take place alternatingly or selectively from shaft 2 or 3 depending on whether or not the dispensing element 5 is moved alternately to the left and right or selectively to the left or right from its resting position.

Because the dispensing element is located at the bottom between the vertical shafts 2 and 3 and because their support areas 8 and 9 are shaped like convex dishes, a space 10 is created below the dispensing element 5 which is not needed for rolling off of the bottles or cans from the support areas 8 or 9. In this space 10, the electric motor 11 (see FIG. 2) to drive the dispensing element 5 can be placed. It, thus, does not require any part of the depth of the vending machine so that the entire depth is available for storage of the bottles or cans. The motor 11 also does not occupy any of the space between the shafts which should be placed as close to each other as possible in order to design the storage capacity of the vending machine for merchandise or different types of products which are as large as possible with respect to certain outer dimensions. According to FIG. 2, an eccentric lever 12 is articulated on the dispensing element 5. This acts on a disc 13 which can be driven by the motor 11. If, for example, the electric motor 11 rotates the disk 13 in the direction of the arrow S starting from the resting position described in FIG. 2, then the dispensing element 5 rotates in the direction of the arrow 1. If, during rotation of the disk 13 in the direction of the arrow 5, the eccentric lever is moved beyond dead center then the motion of the dispensing element 5 reverses. The electric motor 11 stops when the disk 13 reaches position S'. Then a product from the right shaft 3 has been dispensed. If, from position S', the disk 13 is moved in the direction of the arrow T counter to the direction of the arrow S then again product dispensing takes place from the right merchandise shaft 3. If, however, the disk 13 is moved from position S' in the direction of the arrow U to position U' then dispensing takes place from the left product shaft 2. To control the direction of rotation of the electric motor 11 the disk 13 can have a control projection 14 and control slot 15 that interact with a switch for the motor.

In FIGS. 3 through 11, the same reference numerals are used to describe the same or similar parts.

Figure 3:
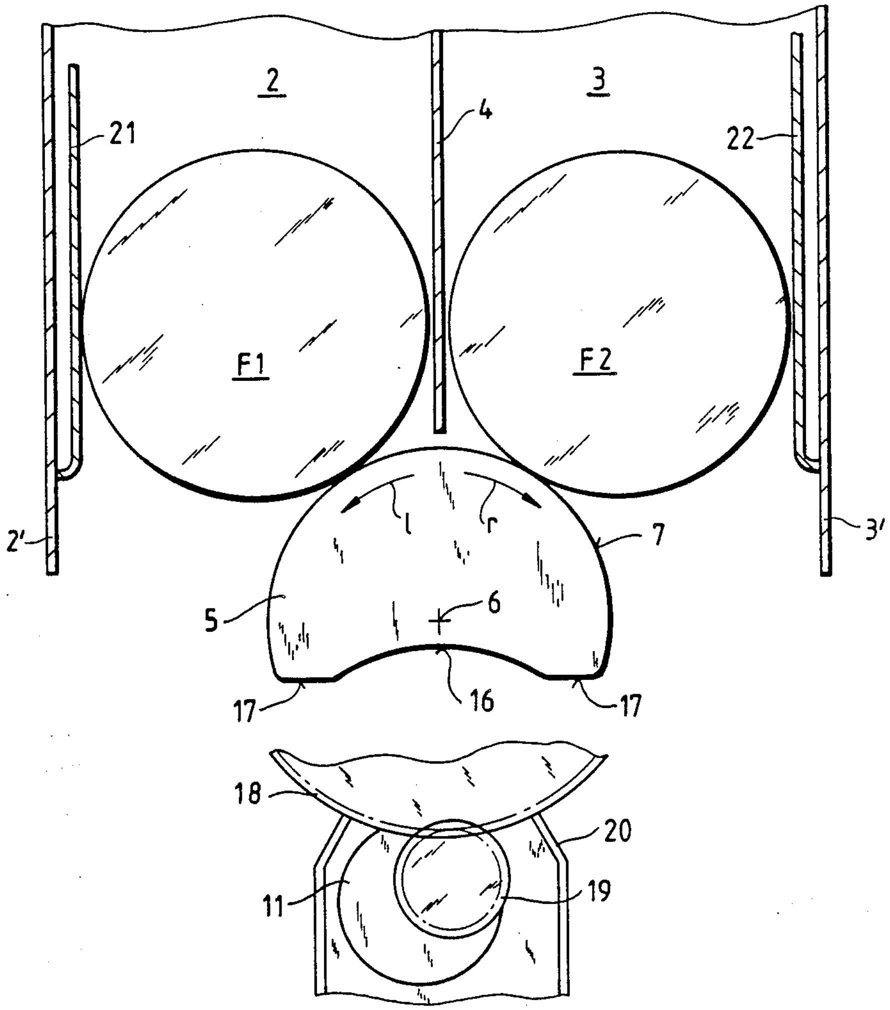
FIG. 3 is a view similar to FIG. 1 of a further embodiment of the invention in a resting position.
Figure 4:
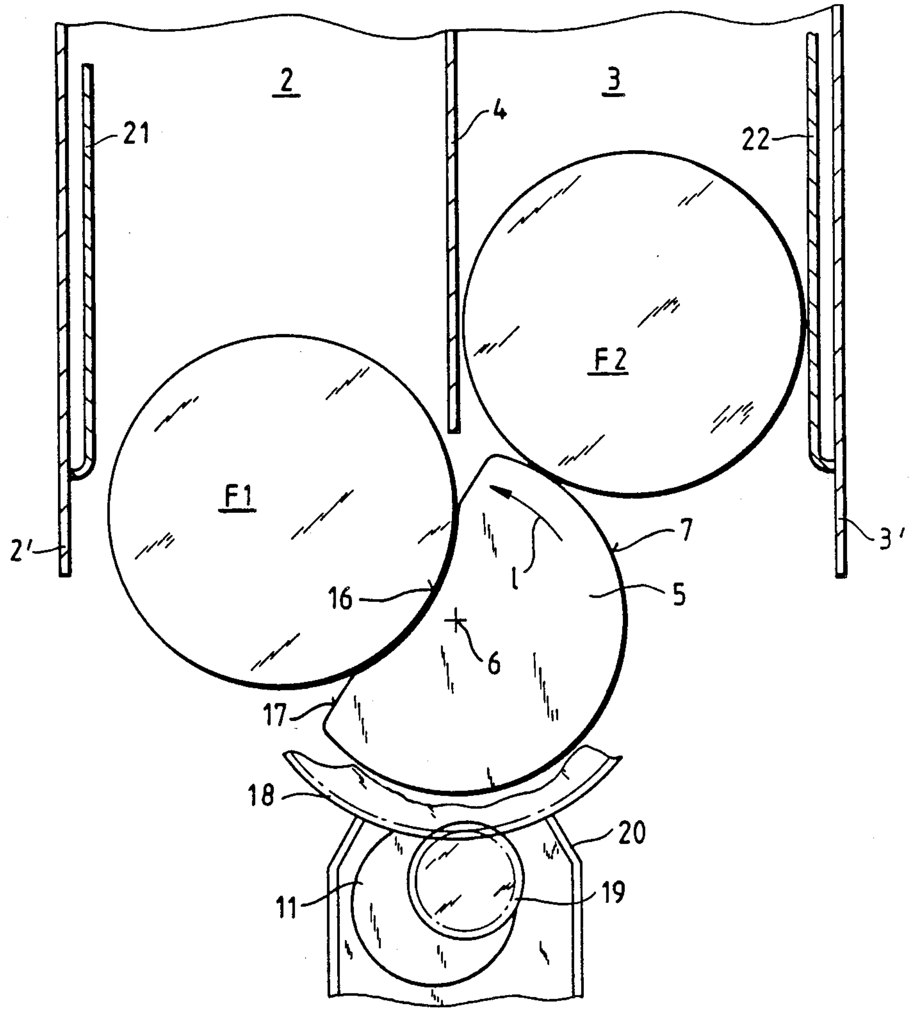
FIG. 4 is a schematic sectional view of the embodiment according to FIG. 3, in an acceptance position.
Figure 5:
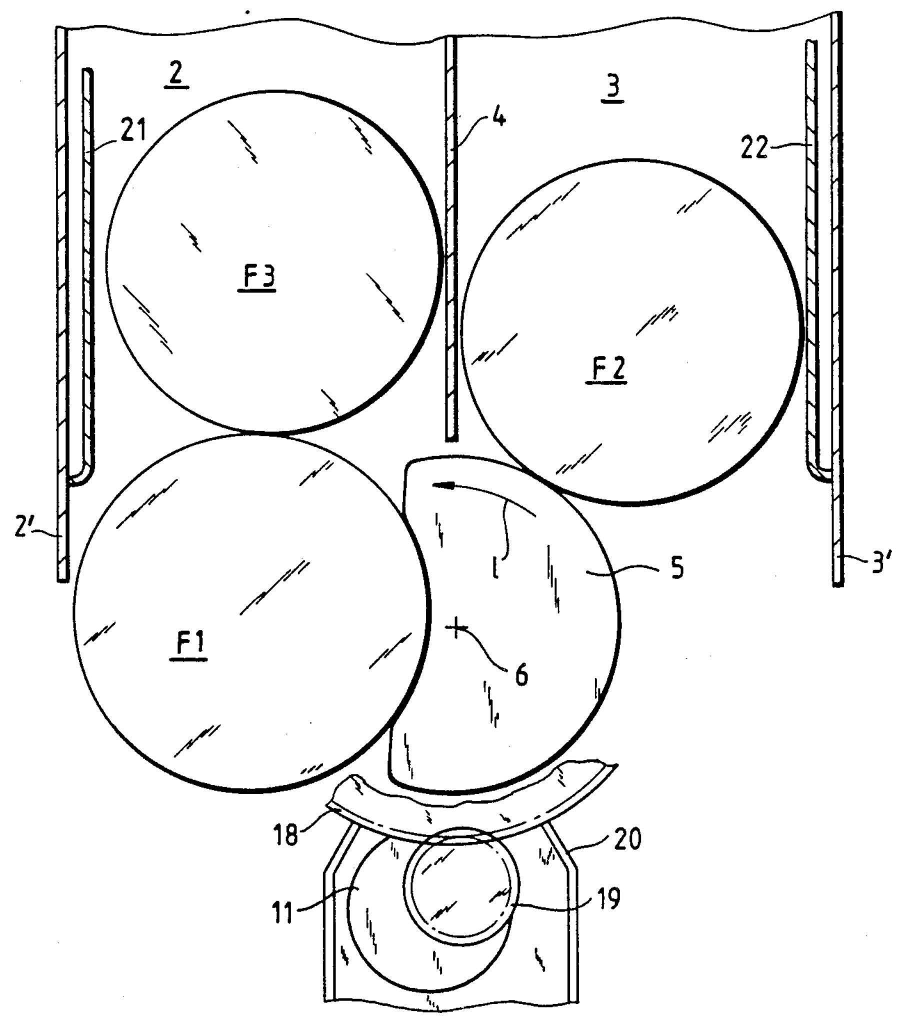
FIG. 5 is a view similar to FIG. 4 of the embodiment according to FIG. 3 shortly before dispensing a piece of merchandise.
Figure 6:
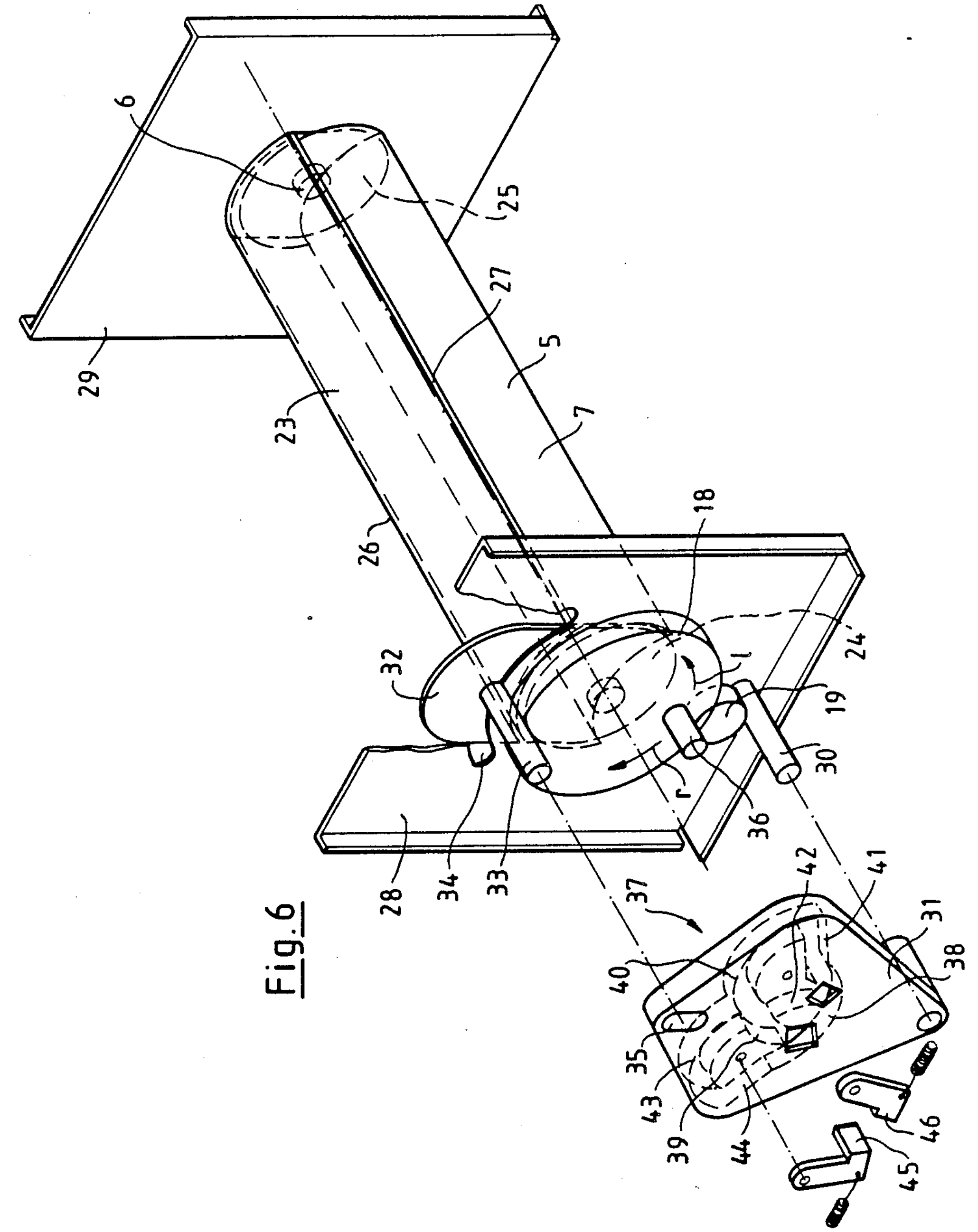
FIG. 6 is an exploded perspective view of a third embodiment of the invention with dispensing element and a screen.
Figure 7:
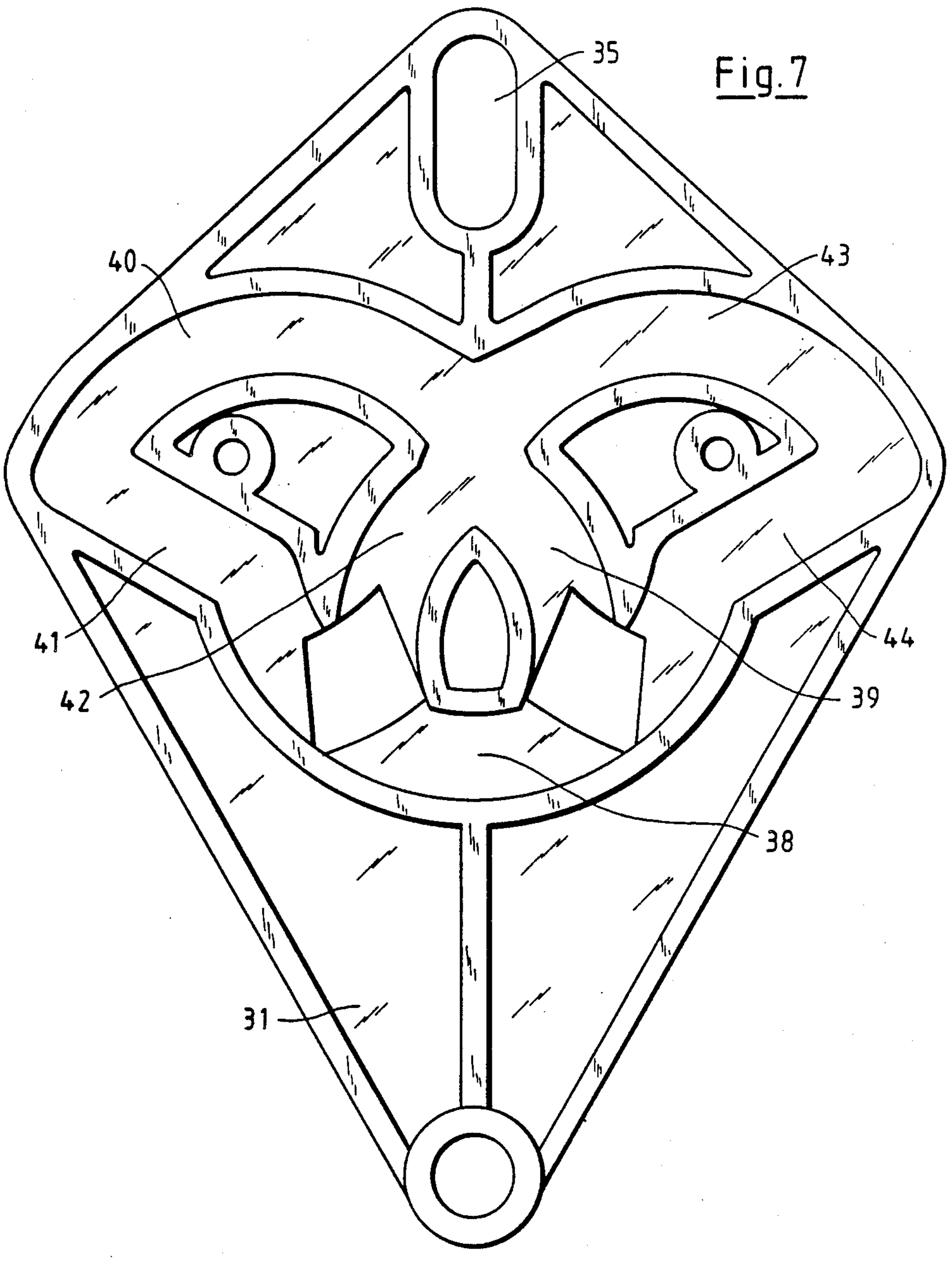
FIG. 7 is a side elevational view of a control curve of the screen.

In the embodiment according to FIGS. 3 to 5, the dispensing element 5 has only one support area 16. As in the embodiment according to FIG. 1, the support area 16 is concave on the dispensing element 5 whereas the block area 7 is convex. The radius of the support area corresponds approximately to that of a bottle or can F1, F2. On both sides of the support area 16 are flattened areas 17.

A gear wheel 18 is provided on axis 6 on which a drift pinion 19 of the motor 11 acts. The motor 11 is located below the dispensing element 5 under a cover 20.

The operation of the dispensing unit according to FIGS. 3 to 5 is approximately as follows:

FIG. 3 shows the dispensing element 5 in its resting position. The block area 7 blocks off the shafts 2,3. The motor 11 rotates the dispensing element 5 alternately to the right or left via the drift pinion 19 and the gear wheel 18. If, starting from its resting position, the dispensing element 5 is rotated in the direction of the arrow r by approximately 120° then the dispensing element 5 is moved into the acceptance position shown in FIG. 4. In this position the block area blocks as before the right shaft 3. A bottle or can F1 from the left shaft 2 reaches the support area 16. Then a reversal of the direction of rotation takes place which is controlled by, for example, a sensor, so that the dispensing element 5 rotates back in the direction of the arrow 1 (see FIG. 5). The bottle or can lying on the support area 16 then reaches the dispensing point and the block area 7 again blocks the left shaft 2. The dispensing element 5 is in its resting position afterwards.

If from the shaft 3, a bottle or can is to be taken, then the dispensing element 5 is rotated back from the resting posiiton in the direction of the arrow 1 to the resting position.

In the shafts 2,3 rods 21,22 are inserted on the outer wall. These provide a desired point at which the bottle or can that is lowest at any given time can rest on the dispensing element 5. If a bottle or can lies on the support area 16 then it is free of the rod 21 or 22 so that it can easily reach the dispensing compartment.

Figure 2:
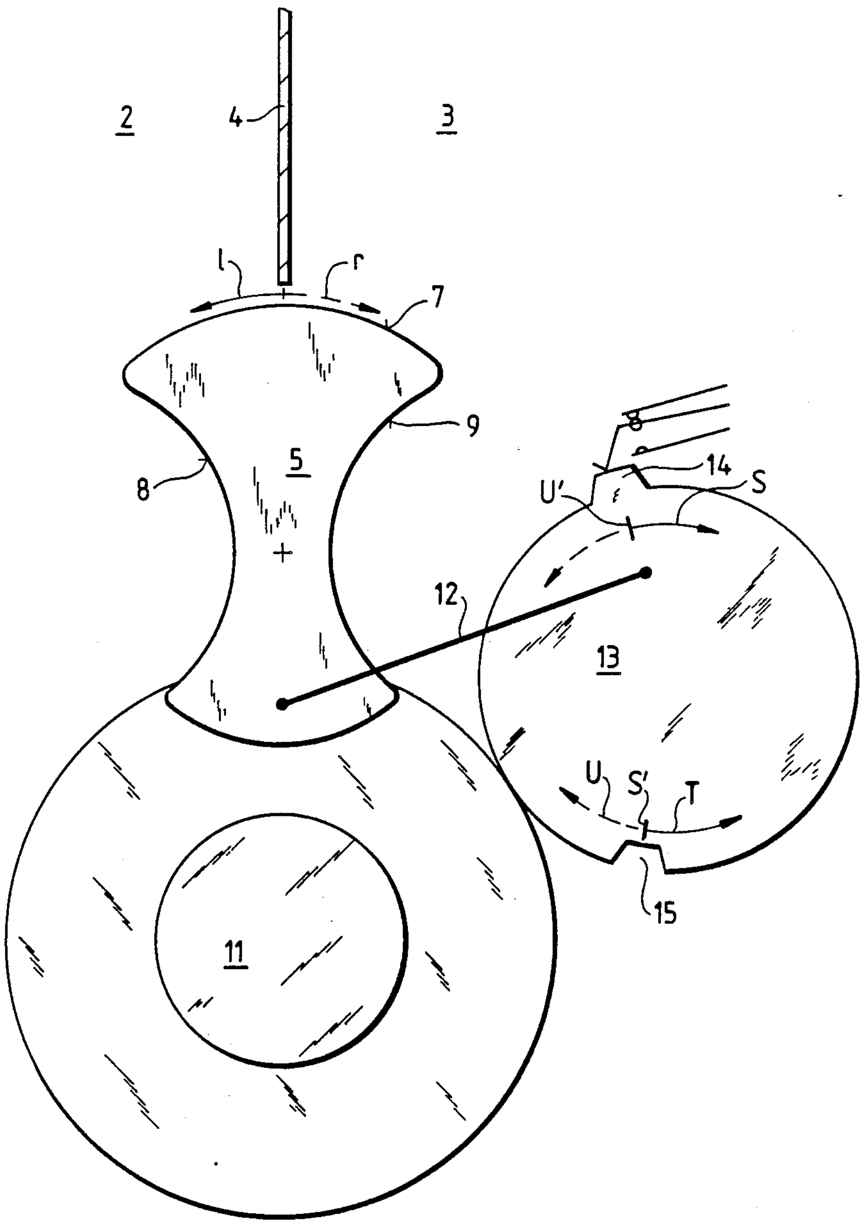
FIG. 2 is a schematic side view of an embodiment of a drive for the dispensing element.

The construction of the embodiment according to FIGS. 3 to 5 is still more compact than that of the embodiment according to FIGS. 1 and 2. In particular, a low construction height of the dispensing unit has been achieved. In this way the merchandise storage capacity of the vending machine is increased.

The dispensing element 5 can also be assigned to a shaft pair in which four merchandise stacks are stored. The shaft 2 in that case is designed in such a way that it guides a front merchandise stack to the right and a back merchandise stack to the left in a manner that is known. The shaft 3 is then designed accordingly.

The embodiment according to FIGS. 6 to 11 provides a screen 23 in addition to the dispensing element 5. This is placed, via brackets 24 and 25, on the rotatational axis of the dispensing element 5 and can be rotated. The screen 23 is partially cylindrically shaped. Its radius is only slightly greater than that of the block area 7 (see FIGS. 8 to 11) so that the screen 23 can be rotated with respect to the block area 7 without touching it. The edges 26 and 27 of the screen 23 are beveled so that a flat transition between the block area 7 and the screen 23 results.

The dispensing element 5 is placed between two carrier 28 and 29. A pinion 19 of a motor acts on a gear wheel 18. Below the pinion 19 on the carrier 28 there is a bearing neck 30 for a cam eccentric 31.

On the screen 23 there is a drive peg 33 on a tab which penetrates a partially circular slot 34 of the carrier 28. The cam eccentric 31 has a hole 35 into which the drive peg 33 reaches.

To drive the cam eccentric 31, an eccentric bolt 36 is located on the gear wheel 18. This reaches into a recessed area or cam 37 of the cam eccentric 31.

The cam 37 drives the eccentric when the gear wheel 18 turns in a clockwise direction r, the bolt 36 starting at a resting position section 38, moves along an adjust section 39, a hold section 40 and a reset section 41. Corresponding adjust section 42, hold section 43 and reset section 44 are provided for the drive of the cam eccentric 31 during rotation of the gear wheel 8 in a counter-clockwise direction 1.

On the cam eccentric 31 two shunt tongues 45 and 46 are located which can be rotated. The shunt tongue 45 prevents the bolt 36, when it is turned in a clockwise direction, from slipping into the reset cam section 44. It thus glides along in the adjust section 39. The shunt tongue does, however, allow the bolt 36 to enter from the reset section 44 into the resting position section 38 when the bolt is turned in a counter-clockwise direction. The same applies to the shunt tongue 46. It prevents the bolt 36 from getting into the reset section 41 when it is turned in a clockwise direction. Shunt tongues 45 and 46 are spring loaded to hold them resiliently down against a lower wall of resting position section 38 when they are not pushed aside by the bolt 36 as it passes.

The screen 23 is driven by the gear wheel 18 via the cam eccentric 31. In the resting position (FIGS. 6 and 8) the bolt 36 lies in the resting position section 38. If the gear wheel 8, and with it the dispensing element 5, is turned around 360° in a clockwise direction, the bolt initially moves in the adjust section 39 so that the screen 23 is rotated to the left. While the bolt 36 moves in the hold section 40 the screen 23 remains still (See FIGS. 9 and 10) . If thereafter the bolt 36 moves in the reset section 41, the screen 23 rotates back in a clockwise direction (see FIG. 11) until it reaches the resting position again. During motion of the gear wheel 18 in a counterclockwise direction, the screen 23 is rotated correspondingly in the opposite direction.

Figure 8:
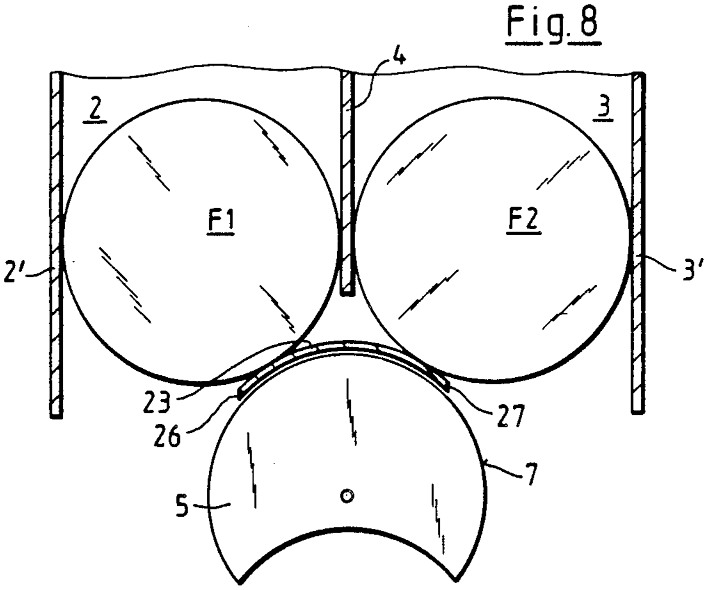
FIG. 8 is a schematic sectional view of the embodiemnt according to FIG. 6 in its resting position.
Figure 9:
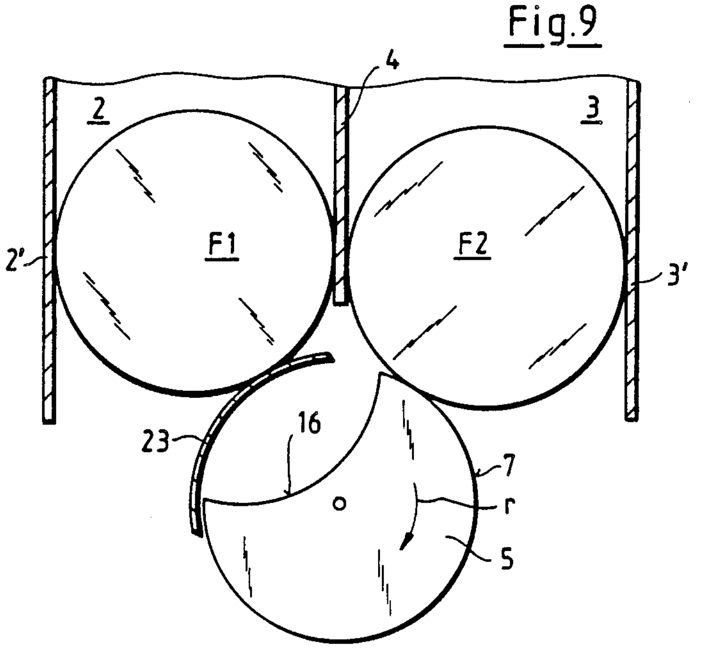
FIG. 9 is a view similar to FIG. 8 showing an intermediate position in which the dispensing element holds a product on the right and the secreen holds a product on the left.

In the resting position shown in FIG. 8, the bottles F1 and F2 of both shafts 2 and 3 rest on the screen 23. The shafts 2 and 3 are blocked securely so that unauthorized manipulations do not cause merchandise to fall out of the shafts.

If the dispensing element 5 is rotated in a clockwise direction r then the screen 23 rotates to the left so that it only supports the merchandise F1 of the left shaft 2. In this position the screen 23 remains initially at rest. The merchandise F2 of the right shaft 3 is now held by the block area 7 of the dispensing element 5 (see FIG. 9).

Figure 10:
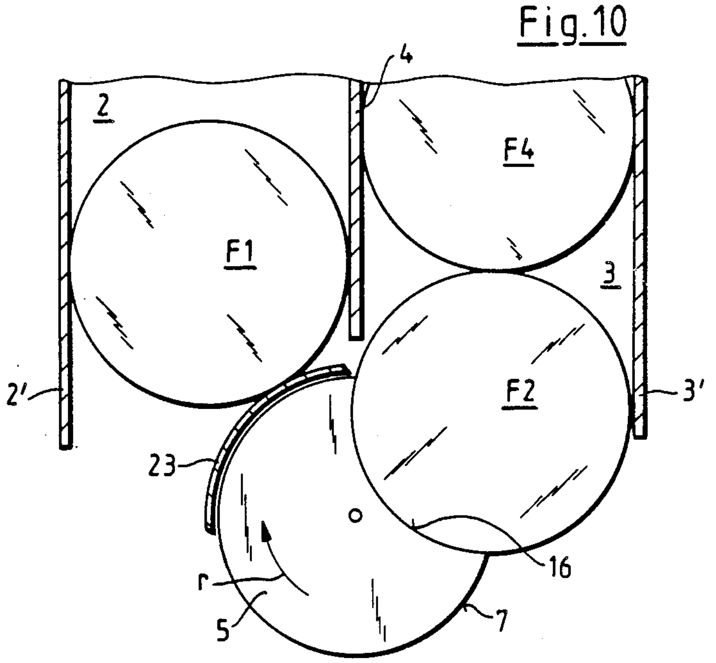
FIG. 10 is view similar to FIG. 8 showing a position in which a right product reaches the support surface of the dispensing element and the screen holds the left product.

If the dispensing element 5 continues rotation into the position shown in FIG. 10, then the merchandise F2 of the right shaft 3 reaches the support area 16 of the dispensing element 5. It is of particular advantage that during this motion the merchandise F2, after it is free of the block area 17, is immediately supported by the support area 16 so that the merchandise does not, not even by a short distance, fall freely onto the support area 16. In that way, the noise during the dispensing process is reduced on the one hand and, on the other, the danger of damage to the merchandise is decreased. Noise development and danger of damage to the merchandise would be especially great when the stack of products resting on the merchandise F2 is high.

Figure 11:
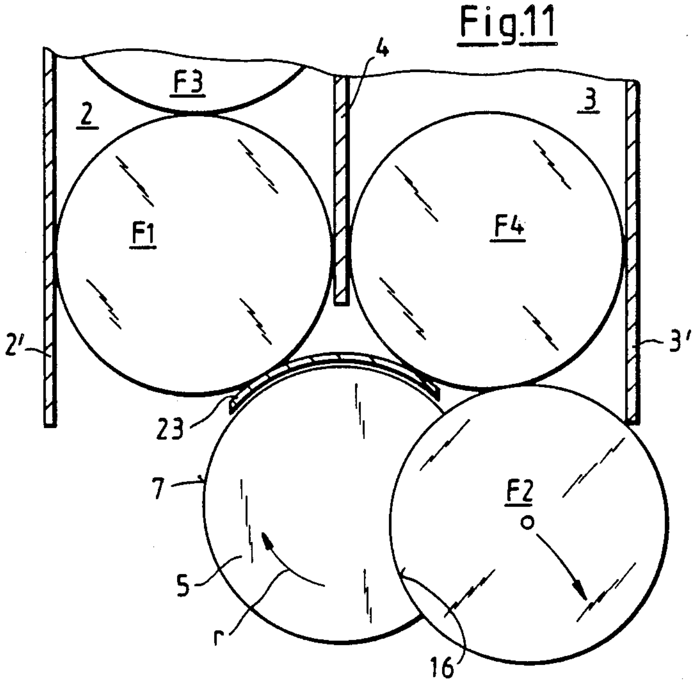
FIG. 11 is a view similar to FIG. 8 showing the position from which the right product leaves the support area in the direction of the dispensing compartment.

During continued rotation of the drive element 5 from the position shown in FIG. 10 into the position shown in FIG. 11, the merchandise F2 is moved downwardly whereby it initially still rests on the side wall 3' of the shaft 3. The merchandise stored above it sinks downwardly with it. In the process of the motion the screen 23 is rotated to the right (see FIG. 11). It moves below the merchandise F4 without releasing the merchandise F1. The merchandise F4 settles on the screen 23. The merchandise F4, thus, does not fall onto the screen 23. The above mentioned advantages of noise reduction and careful treatment of the merchandise relate to this also.

During continued rotation, the merchandise F2 leaves the support area 16 and reaches the dispensing compartment. The dispensing element 5 and the screen 23 rotate further until the resting position (FIG. 8) is reached again.

In the embodiment according to FIGS. 6 to 11 a product has been dispensed from the right shaft 3 through a rotation around 360° in a clockwise direction. Correspondingly, in a rotation around 360° in a counterclockwise direction a product from the left shaft 2 has been dispensed. To allow rotation around 360°, without reversal of motion, is favorable since it can be controlled easily.

If bottles having an especially large diameter are to be dispensed, the partioning wall needs to be removed. The bottles (of the same type) lie in stacked rows staggered with respect to each other. A median plan for these staggered rows would be the mid-plane between the rows. In this case also, according to the embodiments shown in FIGS. 3 or 6, a rotation around 360° permits impact-free soft dispensing of big bottles. Thus, with the device,cans or bottles of very different diameters can be idspensed safely and without interference.

While specific embodiments of the invention have been shown and described in detail to illustrate the application of the principles of the invention, it will be understood that the invention may be embodied otherwise without departing from such principles.

What is claimed is:

1. A dispensing unit for a vending machine having at least one pair of stack of merchandise products with a median plane, one stack being on the left and the other stack being on the right of the median plane, comprising a common dispensing element mounted for rotation below the pair of stacks, said dispensing element having a resting position with portions of said dispensing element disposed below each of the right and left stack for blocking products from leaving each of the right and left stacks so as to retain these products in a blocked position, drive means connected to said dispensing element for rotating said dispensing element, said dispensing element having a least one support area means for receiving a product from either one of the stacks, said dispensing element being shaped so that with rotation of said dispensing element toward the one stack, said support area means receives a product from the other stack while maintaining the product in the one stack in its blocked position and with rotation of the dispensing element toward the other stack, said support area means receives a product from the one stack while maintaining the product in the other stack in its blocked position, said support area being shaped so that as the product being dispensed passes the support area, said dispensing element rotates in an opposite direction back to said resting position, said dispensing element being selectively rotatable toward one stack or the other.

2. A dispensing unit according to claim 1, wherein said dispensing element is mounted for rotation about a rotational axis, and including a partition wall between the right and left stacks of products, said partition wall and said rotational axis lying in said median plane.

3. A dispensing unit according to claim 1, wherein said dispensing element inclues a block area which is spaced from said support area and which, with said dispensing element in its resting position, blocks movement of products from the right and left stacks, said block area being movable in a circle with rotation of said dispensing element.

4. A dispensing unit according to claim 3, including a pair of support areas on opposite sides of said block area.

5. A dispensing unit according to claim 3, wherein said block area is positioned on one side of said dispensing element and said support area is positioned on an opposite side of said block area, said dispensing element including only one block area and only one support area.

6. A dispensing unit according to claim 3, wherein said block area is convex and said support area is concave.

7. A dispensing unit according to claim 3, wherein said block area has a right half portion and a left half portion, said right half portion being under the right stack and said left half portion being under the left stack with said dispensing element in its resting position, with rotation of said dispensing element to the right, said right and left half portions block product from leaving the right stack while admitting a product from the left stack onto said support area, and with rotation of said dispensing element to the left, said right and left half portions block product from leaving the left stack while admitting a product from the right stack onto said support area, said dispensing element being rotatable in an opposite direction when products leave the support area to return said dispensing element to its resting position.

8. A dispensing unit for a vending machine having at least one pair of stacks of merchandise products with a median plane, one stack being on the left and the other stack being on the right of the median plane, comprising a common dispensing element mounted for rotation below the pair of stacks, said dispensing element having a resting position with portions of said dispensing element disposed below each of the right and left stacks for blocking products from leaving each of the right and left stacks, drive means connected to said dispensing element for rotating said dispensing element, said dispensing element having at least one support area for receiving a product from one of the stacks, said dispensing element being shaped so that with rotation of said dispensing element toward the right stack, said support area means receives a product form the left stack and with rotation of the dispensing element toward the left stack, said support area means receives a product from the right stack, said support area being shaped so as the product being dispensed passes the support area, said dispensing element rotates in an opposite direction back to said resting position, including a screen which is mounted for rotation, rotation means inter-connected between said dispensing elements and said screen for rotating said screen under one of the stack when said dispensing element is rotated in a direction of the other of the stacks, said screen having a rest position for blocking products from both the right and left stacks and being rotated into a position under one of the stacks to permit products from the other stack to drop onto said support area of said dispensing element, wherein said screen and said dispensing element are mounted for rotation about a common axis lying in said median plane, wherein said drive means for said dispensing element comprises a wheel operatively connected to said dispensing element for rotating said dispensing element, said rotation means comprising a bolt extending from said wheel and an eccentric cam engaged by said bolt and operatively connected to said screen for rotating said screen in an opposite direction from the rotation of said dispensing element.

9. A dispensing unit according to claim 8 , wherein said dispensing element includes a cylindrical block area, said support area comprising a concave area communicating with said block area, said screen having a curve contour positioned radially outwardly of said cylindrical block area.

10. A dispensing unit according ot claim 9, including a partition wall lying on said median plane above said axis of rotation of said dispensing element and said screen, said partition being positioned between the right and left stacks.

11. A dispensing unit for a bending machine having at least one pair of stacks of merchandise products with a median plane, one stack being on the left and the other stack being on the right of the median plane, comprising a common dispensing element mounted for rotation below the pair of stacks, said dispensing element having a resting position with portions of said dispensing element disposed below each of the right and left stacks for blocking products from leaving each of the right and left stacks drive means connected to said dispensing element for rotating said dispensing element, said dispensing element having at least one support area for receiving a product from one of the stacks, said dispensing element being shaped so that with rotation of said dispensing element toward the right stack, said support area receives a product from the left stack while maintaining the product in the right stack in its blocked position and with rotation of the dispensing element toward the left stack, said support area means receives a product from the right stack, said support area being shaped so that as the product being dispensed passes the support area, said dispensing element rotates in an opposite direction back to said resting position, including an additional support area opposite from said first mentioned support area on said dispensing element, said dispensing element including a cylindrical convexly curved block area between said support area, said block area having portion below each of said right and left stacks with said dispensing element in its resting position, which of said support areas being concavely shaped.

12. A dispensing unit according to claim 11, including a partition wall lying on said median plane between the right and left stacks, said dispensing element being mounted for rotation on a rotation axis which is coplanar with said partition wall.

13. A dispensing unit for a vending machine having at least one pair of stacks of merchandise products with a median plane, one stack being on the left and the other stack being on the right of the median plane, comprising: a common dispensing element mounted for rotation below the pair of stacks, said dispensing element having a resting position with portions of said dispensing element disposed below each of the right and left stacks for blocking products so as to retain products in a blocked position and preventing products from leaving each of the right and left stacks, said dispensing element having at least one support area for receiving a product form either one of the stacks; said dispensing element is shaped such that rotation of said dispensing element allows said support area to receive a product from one stack while simultaneously maintaining the product in the other stack in its blocked position; drive means connected to said dispensing element for rotating said dispensing element for positioning said support area selectively so said support area receives a product from one of said stacks while simultaneously maintaining a product in the other stack in its blocked position and subsequently rotating said dispensing element into its resting position thereby allowing the product being dispensed to pass the support area and for blocking products not dispensed, said dispensing element being rotatable selectively to dispense either a product from the same stack as the product just dispensed or a product from the other stack.

* * * * *